United States Patent [19]
Tuncer

[11] 3,721,531
[45] March 20, 1973

[54] STEAM-HYDROCARBON REFORMER WITH A SUPPORT SYSTEM FOR CATALYST TUBES THEREIN

[76] Inventor: Mehmet Fahri Tuncer, 110 East 36 Street, A.P. 3C New York, N.Y. 10016

[22] Filed: Aug. 30, 1971

[21] Appl. No.: 175,934

[52] U.S. Cl............23/288 M, 23/277 R, 48/196 R, 122/510, 165/82, 165/178
[51] Int. Cl...........B01j 9/04, F22b 37/24, F28f 5/00
[58] Field of Search....23/288 M, 288 H, 288 K, 289, 23/277 R, 277 US; 48/196 R, 94, 105, 102, 107; 122/510; 165/82, 177 US, 178; 196/110 US, 116 US, 133 US; 248/54 R, 54 CS

[56] References Cited

UNITED STATES PATENTS

| | | | |
|---|---|---|---|
| 3,062,197 | 11/1962 | Fleischer | 122/510 |
| 3,172,739 | 3/1965 | Koniewiez | 23/288 M |
| 3,195,989 | 7/1965 | Pyzel | 23/288 M |
| 3,460,924 | 8/1969 | O'Sullivan | 23/277 R X |
| 3,607,130 | 9/1971 | Worley et al | 23/288 M |
| 3,671,198 | 6/1972 | Wallace | 23/277 R |

FOREIGN PATENTS OR APPLICATIONS 1,192,688  5/1970  Great Britain.................23/288 M Primary Examiner—Joseph Scovronek
Attorney—Alan K. Roberts et al.

[57] ABSTRACT

A steam-hydrocarbon reformer which includes a source of a gaseous charge with parallel inlet manifolds being coupled to the source. Two parallel rows of vertical catalyst tubes are provided which are connected by inlet tubes to the inlet manifolds. One outlet manifold is provided which is connected by outlet tubes to the catalyst tubes. A counterweight system suspends the catalyst tubes in vertical attitude to relieve the inlet and outlet tubes of the weight thereof. A system is provided at the bottoms of the catalyst tubes permitting horizontal movement of the same but restricting vertical movement thereof. A further counterweight system acts on the bottoms of the catalyst tubes to put the outlet tubes under tension. Sheets are arranged at the tops of the catalyst tubes to which latter freely extend to accommodate thermal expansion of the catalyst tubes. The catalyst tubes are connected together in their respective rows. The inlet manifolds and sheets are supported at the centers thereof to permit outward thermal expansion in opposite directions. A further counterweight system is provided for supporting the inlet manifolds.

7 Claims, 2 Drawing Figures

INVENTOR
MEHMET FAHRI TUNCER
BY
Roberts & Cohen 3,721,531

STEAM-HYDROCARBON REFORMER WITH A SUPPORT SYSTEM FOR CATALYST TUBES THEREIN

FIELD OF INVENTION

This invention relates to steam-hydrocarbon reformers and more particularly to reformers including vertical catalyst tubes connected to inlet manifolds.

BACKGROUND

Steam-hydrocarbon reformers known heretofore involve thermal reactions and are subjected to stress at critical points whereby the safety and reliability of the equipment are greatly reduced.

In addition, in known steam-hydrocarbon reformers, inlet and outlet manifolds are employed which are connected to the associated catalyst tubes by coiled tubes known as pigtails which involve the use of an excess of expensive materials. Moreover, these outlet tubes are known to sag when subjected to hot temperatures during operation.

SUMMARY OF INVENTION

An object of the invention is to provide improved steam-hydrocarbon reformers.

Another object of the invention is to provide for the suspension of catalyst tubes in reformers in such a manner as to allow for free thermal expansion of the inlet and outlet tubes connected thereto whereby it is possible to employ inlet and outlet tubes, the lengths of which are reduced to a minimum whereby a great savings in cost is achieved.

Another object of the invention is to provide improved steam-hydrocarbon reformers which more successfully accommodate thermal expansions than in known apparatus and which furthermore provide for improved accommodation of stresses at critical points.

Yet another object of the invention is to provide an improved design for steam-hydrocarbon reformers in which only one outlet manifold need necessarily be employed.

Still another object of the invention is to provide improved support and guide arrangements for catalyst tubes whereby there is eliminated differential movements between the inlet and outlet tubes so that a practically stressless outlet system is achieved.

To achieve the above and other objects of the invention there is provided a steam-hydrocarbon reformer including a source of a gaseous charge with at least one inlet manifold coupled to this source and a plurality of vertical catalyst tubes, there being furthermore provided a plurality of inlet tubes connecting the catalyst tubes to the manifold. An outlet manifold is also provided and a plurality of outlet tubes connect the catalyst tubes to the outlet manifold. A counterweight means is provided suspending the catalyst tubes in vertical attitude to relieve the inlet and outlet tubes of the weight thereof.

Other objects and features as well as advantages of the invention will be found in the detailed description of a preferred embodiment which follows hereinafter.

DETAILED DESCRIPTION

Figure 1:
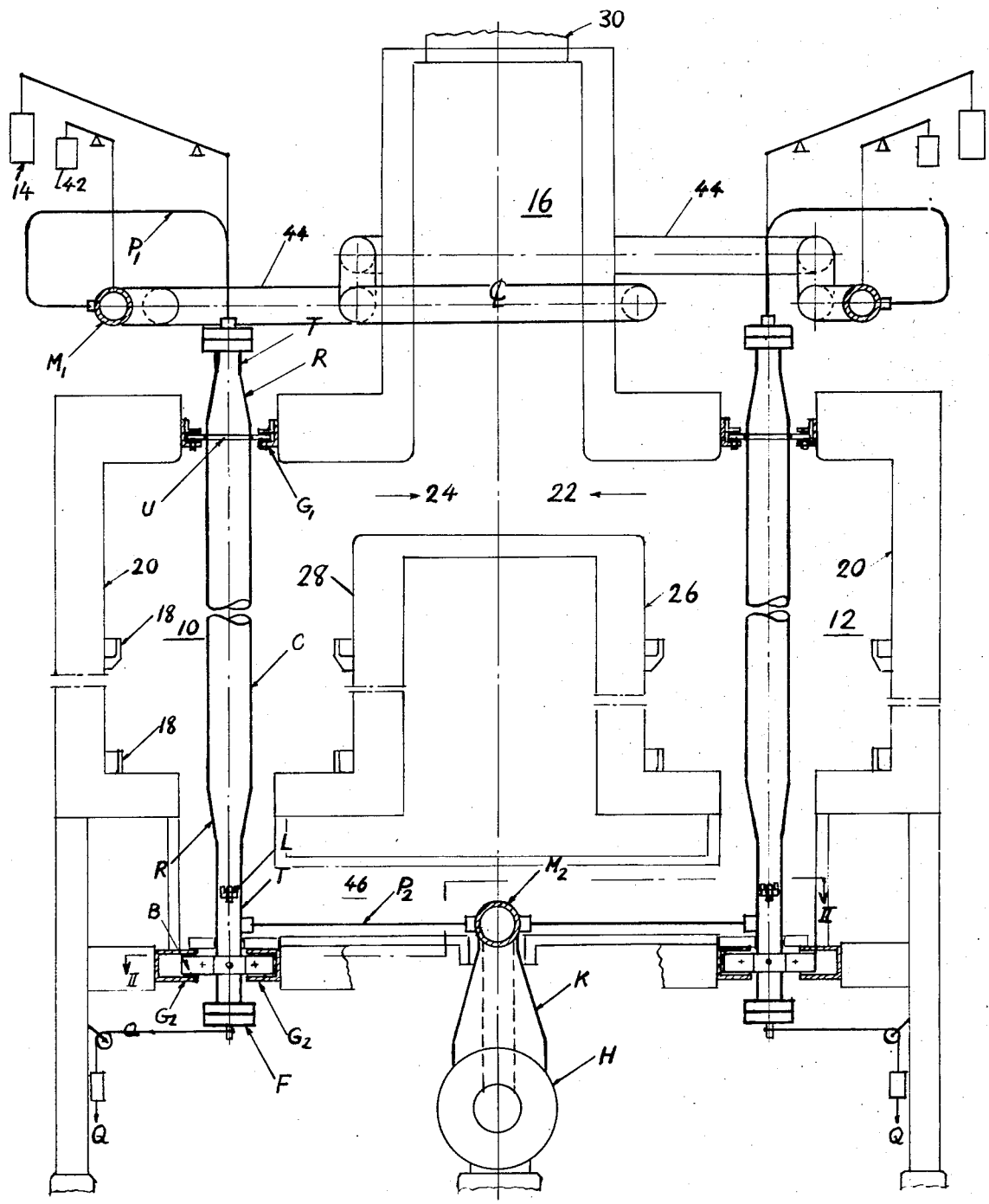
FIG. 1 is an elevational view of a steam-hydrocarbon reformer partly in section, in accordance with a preferred embodiment of the invention.
Figure 2:
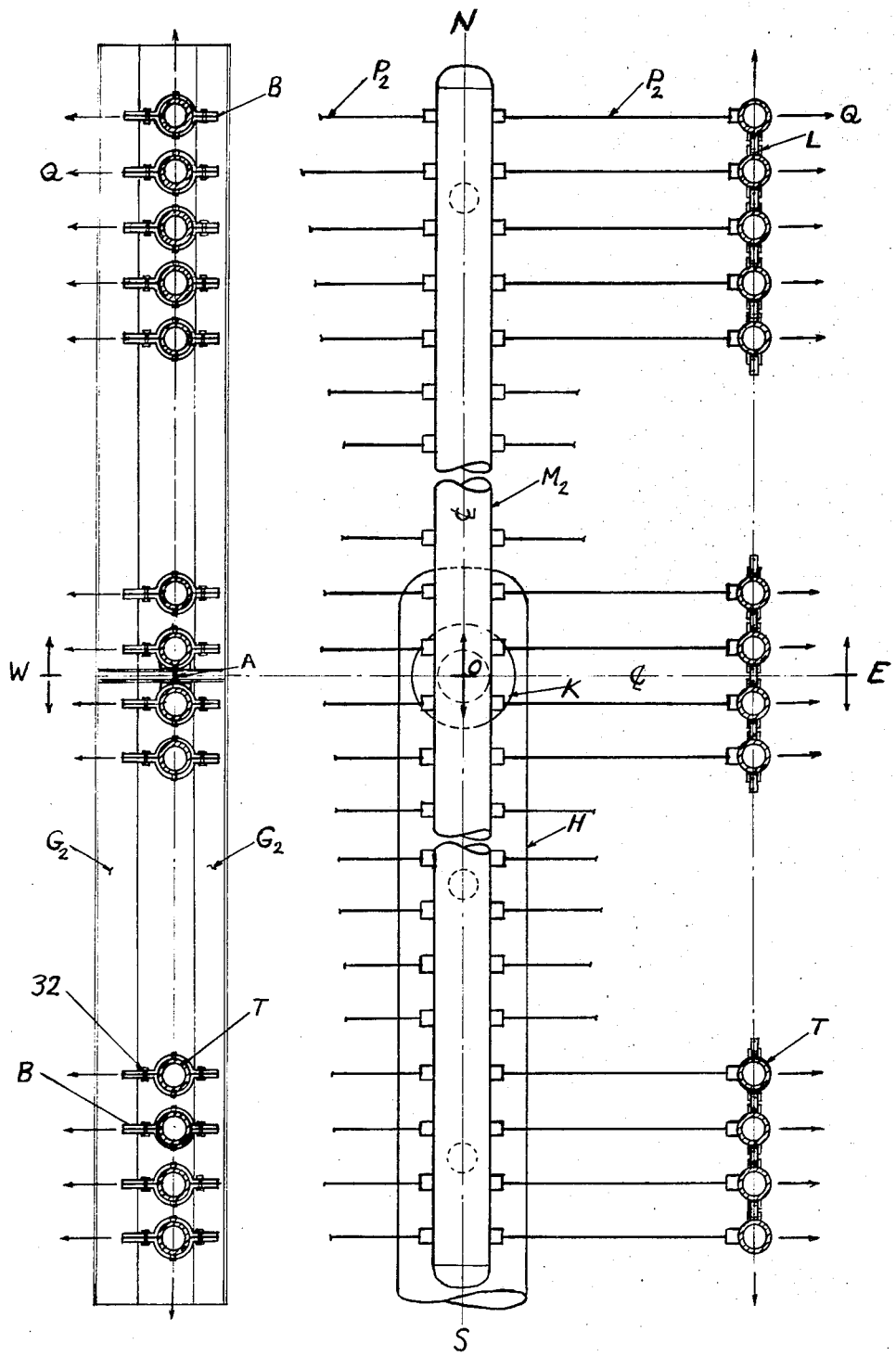
FIG. 2 is a sectional view taken along sectional line II—II in FIG. 1.

As shown in the drawing, a tubular steam-hydrocarbon reforming furnace may consist, for example, of two chambers 10 and 12 placed side by side in duplex arrangement. This duplex arrangement functions as a single unit.

A single row of centrifugally cast alloy catalyst tubes C are provided which are filled with catalysts, the row being arranged vertically along the center line of each chamber 10 and 12 and the catalyst tubes thereof being supported at their tops by a counterweight system 14.

The process charge, which is a mixture of steam and hydrocarbon gases, is preheated in chamber 16 to a temperature of about 2,000°F. This charge passes through an inlet cross over 44 to an inlet manifold $M_1$ located at the top of each furnace chamber 10 or 12. The charge is distributed into the catalyst tubes C via inlet tubes $P_1$ which are connected to the upper ends of the respective catalyst tubes.

On the side walls of each furnace chamber are installed gas burners 18 which are located at several levels and are capable of heating up the refractory walls 20. Using the heat radiating from the walls the catalyst tubes are heated uniformly.

The reforming process takes place in the catalyst tubes C at a temperature of about 1,560°F. The hydrocarbon gases are oxidized with the steam and as a final product, a mixture of hydrogen, carbon monoxide and carbon dioxide is obtained at the lower ends of the catalyst tubes. This product passes through the small (e.g., ¾ inch to 1¼ inch diameter) Incolloy (a heat resisting alloy) tubes $P_2$ which connect the lower ends of the catalyst tubes to a centrifugally cast alloy outlet manifold $M_2$. The product then passes successively through a partially lined conical reducer K and an internally lined carbon steel manifold H and then leaves the primary reformer.

The flue gas, at a temperature of over 1,800°F., leaves the furnace chambers through the openings 22 and 24 located at the upper part of the inner side walls 26 and 28. The heat of the flue gas is utilized for preheating the process charge and for heating air and also for super heating the steam and for other similar purposes. The flue gas is then discharged into the atmosphere by the use of a fan (not shown) or via a regular stack 30.

As is shown in the drawing, the catalyst tubes C are positioned in vertical attitude along the longitudinal axis of each chamber 10 and 12. The catalyst tubes are connected to each other at their lower and upper portions respectively with lugs L and by means of closure plates or sheets U along the longitudinal axis of each chamber. Each tube is suspended from its top by means of a spring or counterweight system so that it is supported in floating condition.

During loading and discharging of the catalyst, the tubes C are supported on a pair of horizontal continuous support structure channels $G_2$ by means of a pair of bars B shaped in the form of a pipe clamp which is clamped on the tubes by means of bolts 32.

Each catalyst tube C is connected, as stated above, by an outlet tube made for example of Incolloy to the outlet manifold $M_2$ located on the longitudinal axis between the chambers 10 and 12 in horizontal disposition. Contrary to previously known reformers, only one outlet manifold need be employed in accordance with the invention.

The diameter of the catalyst tubes C is reduced as indicated at T at the upper and lower extremities of the tubes with a conical reducer portion R. This permits reducing the size of the flanges F which are employed for purposes of enabling the loading and unloading of the catalyst. This, in turn, makes it possible to arrange the catalyst tubes as close as possible and, as a result, a savings of materials and a shorter furnace box construction is obtained.

A counterweight system Q is coupled to the lower extremities of the catalyst tubes pulling in a direction away from the outlet manifold $M_2$ and may be coupled for convenience to the bottom flanges of the catalyst tubes. The tension force exerted by the counterweight system Q is designed to be slightly larger than any frictional force which may occur in a sliding of the bars B on the supports $G_2$ due to thermal expansion or the like. Due to the tension force exerted by the counterweight systems Q the outlet tubes $P_2$ will be under tension during operation.

The inlet manifold $M_1$ and the closure plate U and its guides $G_1$ at the top of each chamber are fixed centrally of their length by clamps (not shown). The catalyst tubes and outlet manifold $M_2$ are also fixed, at points A and O respectively, on the transverse axis W-E of the chambers. This permits an outlet expansion of these various parts away from the axis W-E to accommodate thermal expansion.

During commencement of an operation the catalyst tubes C having a base for vertical movement in the form of lower support $G_2$ will expand upwardly since support $G_2$ restricts vertical movement of clamp B while allowing horizontal movement of the same. The inlet manifolds $M_1$, being each suspended by a counterweight system 42, will move upwardly together with the catalyst tubes. Because of the thermal expansion of the plates or sheets U at the top end of the connecting lugs L, the arrangement at the lower end will grow simultaneously at the same rate from the fixed point at the centers thereof towards the ends of the chamber and will carry the catalyst tubes along with them.

As a consequence, the catalyst tubes will remain substantially parallel to each other. The outlet manifold $M_2$, being fixed at the midpoint O thereof, will also grow towards the ends N-S. The lugs L being at the same temperature and preferably of the same material as the outlet manifold will grow thermally at the same rate.

The lower part of the catalyst tubes between the floor of each chamber and support $G_2$, and manifold $M_2$, are located in insulating box 46.

From what has been stated above, it will be seen that there is provided a steam-hydrocarbon reformer including a source of a gaseous charge with two parallel inlet manifolds and one outlet manifold with inlet and outlet tubes connecting the manifolds to two rows of vertical catalyst tubes. By reason of the suspension of the catalyst tubes, horizontal friction forces in the supports $G_2$ are reduced to a minimum. As a consequence, there is a substantial relieving of stresses and a great savings of materials.

Advantageously, the invention provides for applying an external force on each catalyst tube so that:
1. Direction of the force is towards the outside side walls of each chamber;
2. Application of this force can be at any suitable location at the lower part of the catalyst tubes, preferably at the lower flanges for reformers having bottom flanges;
3. This force can be exerted by means of a tension spring or a counter weight device;
4. The magnitude of this force can be designed to overcome friction forces involve in the support of the catalyst tube;
5. The same idea is applicable for reformers having single or double rows of tubes, with or without lower flange arrangements;
6. The application of such a force is such as:
   to pull the catalyst tube in the axial direction of its outlet tube to provide free movement for thermal expansion growth;
   to assure the axial forces in the outlet tubes are limited to be equal to or smaller than applied forces; and
   to keep the outlet tubes under tension to prevent sagging under their own weight, in which event an intermediate support would be required.

The invention further provides for having a free movement at the catlyst tube ends of the outlet tubes whereby a practically stressless outlet system is achieved. Therefore, instead of requiring a pigtail, a straight piece of Incolloy tube, for example, can be used as an outlet tube, although the invention can as well be applied for curved outlet pigtail conditions.

Further, the invention removes restrictions against thermal expansion movement of the outlet tube at the catlyst tube end, which makes it possible to use only one outlet manifold for both chambers. The substitution of a single manifold for two manifolds, one for each chamber, as a regular practice, achieves considerable savings. Further, the use of a common outlet manifold for both chambers, being symmetrically loaded by predetermined pulling forces, will have no moment effect in the manifold, unlike two manifold arrangement.

With the above-described lug attachment to tie the lower portions of the catalyst tubes to each other along the longitudinal axes of the chambers and the anchoring at the midpoint with growth towards the ends, outlet manifold differential movement between the ends of outlet tubes is eliminated. In addition, free movement of the catalyst tube ends of the outlet tubes achieves an outlet system without thermal stresses. In the absence of thermal forces and moments in the entire outlet system, the safety and reliability of the reformer is greatly improved.

The invention also provides for arranging the catalyst tubes as close as possible to each other. Thus, the diameter of the catalyst tubes is reduced at the lower and upper extensions thereof, outside of the furnace. Especially for reformers with large tube diameters, the savings in flange and alloy tube is considerable.

The above-described inlet and outlet arrangement is applicable for any production capacity. By changing the number of catalyst tubes, any desired capacity can be obtained. This leads to the standardization of various hardware sizes which achieves further cost reduction.

There will now be obvious to those skilled in the art many modifications and variations of the construction set forth hereinabove. These modifications and variations will not depart from the scope of the invention if defined by the following claims.

What is claimed is:

1. A steam-hydrocarbon reformer comprising a source of a gaseous charge, at least one inlet manifold coupled to said source, a plurality of vertical catalyst tubes, a plurality of inlet tubes connecting the catalyst tubes to said manifold, and outlet manifold, a plurality of outlet tubes connecting the catalyst tubes to the outlet manifold, means suspending said catalyst tubes in vertical attitude, and means applying a force to said catalyst tubes tending to put said outlet tubes under tension.

2. A reformer as claimed in claim 1 wherein there are two parallel inlet manifolds and one outlet manifold and wherein there are two parallel rows of said catalyst tubes, said inlet tubes connecting the inlet manifolds to respective of said rows of catalyst tubes.

3. A reformer as claimed in claim 2 comprising means at the bottoms of the catalyst tubes permitting horizontal movement of the same but restricting vertical movement of the same.

4. A reformer as claimed in claim 3 comprising sheets at the tops of the catalyst tubes through which the latter freely extend to accommodate thermal expansion of the catalyst tubes, said sheets permitting horizontal expansion of said rows.

5. A reformer as claimed in claim 4 comprising means connecting the catalyst tubes in each respective row together.

6. A reformer as claimed in claim 5 comprising means fixing the inlet manifolds and sheets at the centers thereof whereby outward thermal expansion in opposite directions is permitted.

7. A reformer as claimed in claim 1 wherein the catalyst tubes include tapered top and bottom extremities.

\* \* \* \* \*